May 12, 1964 R. E. BROCHETTI 3,132,553
ROTARY CUTTER WITH CENTRIFUGAL FEED
Filed Feb. 24, 1961 2 Sheets-Sheet 1
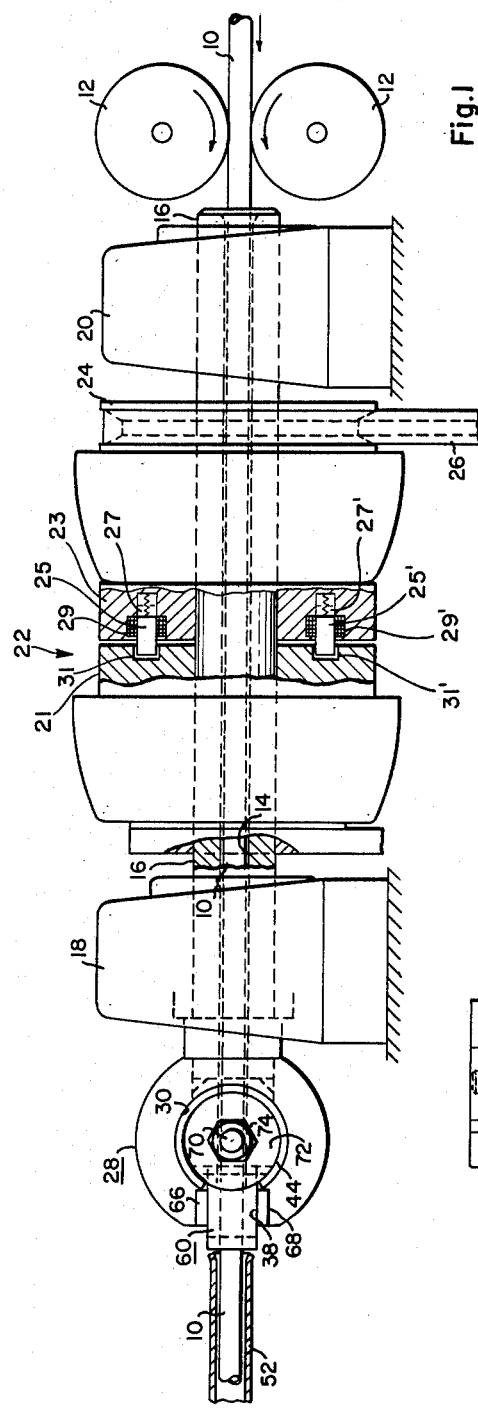
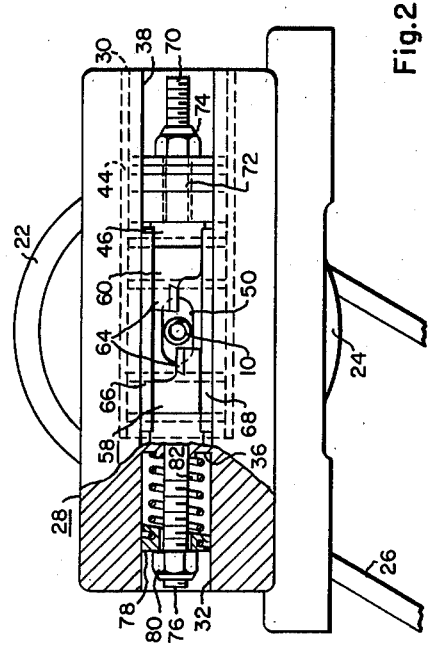
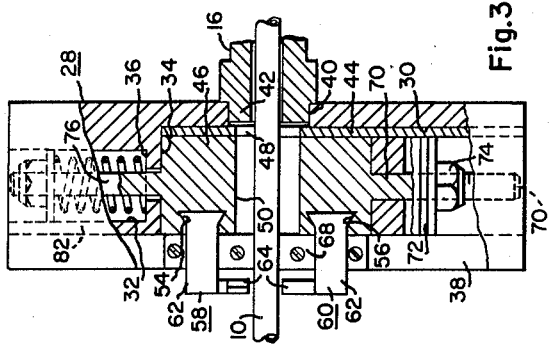
INVENTOR
Raymond E. Brochetti
BY
Williams, Tilbury & Gobrick
ATTORNEYS

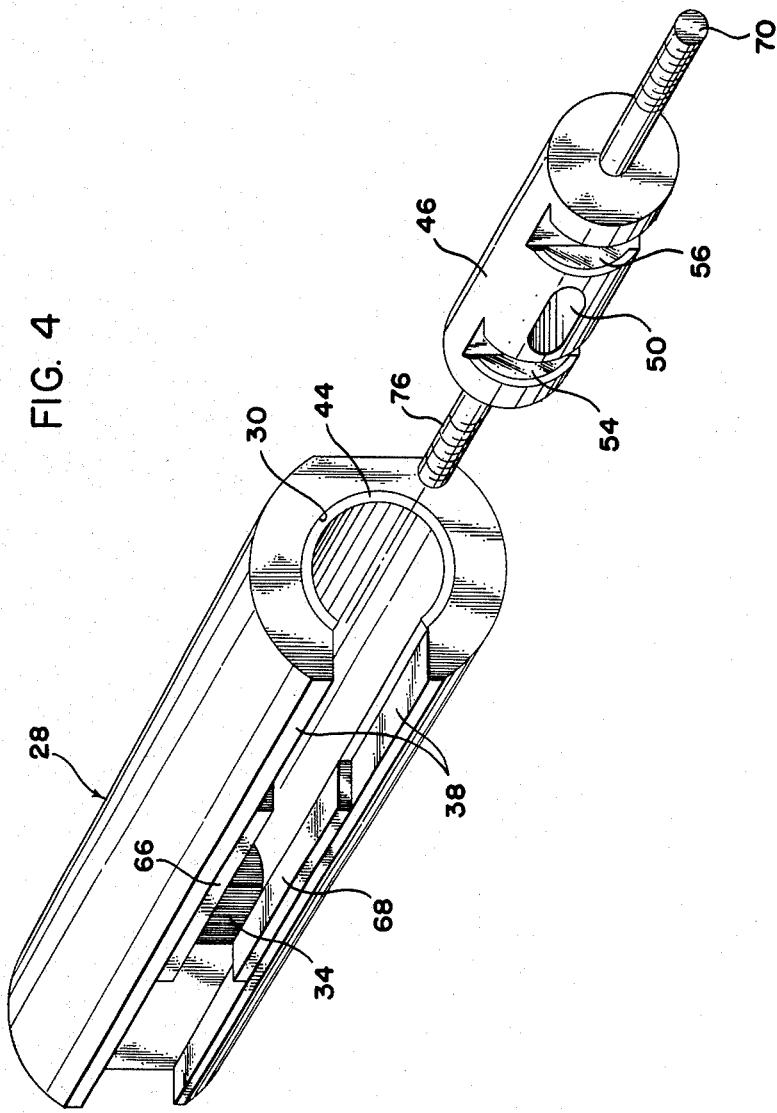

United States Patent Office 3,132,553
Patented May 12, 1964

3,132,553
ROTARY CUTTER WITH CENTRIFUGAL FEED
Raymond E. Brochetti, Chicopee, Mass., assignor to E. W. Bliss Company, Canton, Ohio, a corporation of Delaware
Filed Feb. 24, 1961, Ser. No. 91,469
8 Claims. (Cl. 82—63)

This invention relates to apparatus for cutting to length elongated workpieces such as bars and tubes. More particularly, the invention relates to cut-off apparatus employing unbalanced weights to cause a cutting tool, under the effect of centrifugal force, to be fed into a workpiece being cut.

Although not limited thereto, the present invention is particularly adapted for use in cutting tubular members and the like where it is necessary to sever the workpiece with no burrs or damage to the cut ends. In the past, various types of saws and shears have been used for this purpose; however, in the case of a shear, for example, the tube is often partially collapsed or deformed at the cutting edge due to the initial impact of the shear. Cut-off saws, although possibly better from the standpoint of deformation or pinching of the tube ends, nevertheless produce a rough or burred end on the tube which usually must be thereafter removed in a dressing or grinding operation.

As an overall object, the present invention provides new and improved apparatus for cutting elongated workpieces, particularly tubular members.

More particularly, an object of the invention resides in the provision of a rotary cutter, operable under the effect of centrifugal force, which continuously travels around the periphery of a workpiece while gradually cutting the same in a turning operation.

Still another object of the invention is to provide tube cutting apparatus particularly adapted for use in continuous tube lines and the like where it is necessary to cut the tubing to length rapidly and automatically, and with no damage to the cut ends.

In accordance with the invention, hereinafter described, the tubing to be cut is positioned within a bore provided in a member rotatable about an axis coincident with the axis of the bore. With this arrangement, the tubing or other workpiece to be cut may remain stationary while the aforesaid member rotates around it. At one end of the rotatable member is a cutter head which carries a cutting tool for sliding movement along a path at right angles the aforesaid axis of rotation. In this manner, the cutter head will rotate around the tubing at high speed while an unbalancing weight, mounted on the cutting tool, causes the tool to be fed into the tube by the action of centrifugal force. When the cut is complete, rotation of the cutter head is braked, thereby cancelling the centrifugal effect and position preparatory to the next successive cutting operation.

The above and other objects and features of the invention become apparent from the following detailed description taken in connection with the accompanying drawings which form a part of this specification and in which:

FIGURE 1 is an elevational or side view of the cutting apparatus of the invention;
FIGURE 2 is a partially broken away end view of the apparatus shown in FIGURE 1;
FIGURE 3 is a partially broken away top view of the cutter head shown in FIGURE 1; and
FIGURE 4 is a perspective view, partially in section, illustrating the cross slide of the invention.

Referring now to the drawings which are for the purpose of illustrating an embodiment of the invention and not for the purpose of limiting the same, a continuous length of tubing 10 is passed through drive rolls 12 into an elongated bore 14 provided in a rotatable shaft 16. The drive for rolls 12, not shown, includes an electric clutch-brake to control the feed of the material into the bore 14. As shown, the shaft 16 is carried for rotation in a pair of spaced bearing blocks 18 and 20 and has an electric clutch-brake 22 keyed thereto and positioned between the aforesaid bearing blocks. The clutch-brake 22 includes a pulley 24 which is connected through a V-belt 26 to a drive motor, not shown. As illustrated in FIGURE 1, the electric clutch-brake 22 comprises a brake element 21 keyed to the shaft 16 and a clutch element 23 drivingly connected to the pulley 24. The clutch element 23 receives a pair of solenoid armatures 25 and 25' in axial bores 27 and 27', respectively. The armatures 25 and 25' are respectively surrounded by associated solenoid coils 29 and 29'. Upon energization of coils 29 and 29', the armatures 25 and 25' are displaced from their normally spring biased retracted positions, shown by the dotted lines, to their extended positions, shown by the solid lines. In their extended positions the armatures are respectively received by axial slots 31 and 31' in the brake element 21 to thereby effect a driving connection between the pulley 24 and shaft 16. As will be understood, the pulley 24 rotates continuously while the clutch-brake 22 is used to selectively impart rotation to the shaft 16.

Referring now to each of FIGURES 1, 2, 3 and 4, carried at the left end of shaft 16 is a transversely-extending cutter head 28 having two coaxial bores 30 and 32 provided therein with the axes of the bores 30 and 32 intersecting the axis of rotation of shaft 16 at right angles. As is best shown in FIGURE 3, bore 30 is of larger diameter than bore 32 and extends from one side of the cutter head 28 to a shoulder 34. In a similar manner, the bore 32 of smaller diameter extends from the other end of the cutter head to a shoulder 36. The forward face of the cutter head 28 is milled to provide a continuous slot 38 which, as shown in FIGURE 1, communicates with the bore 30. The back face or wall of the cutter head is provided with a bore 40 which receives a reduced diameter end 42 of the shaft 16 whereby the cutter head will rotate with the shaft as an integral unit.

The bore 30 is lined, as shown, with a generally C-shaped tubular bearing 44 which receives a cylindrical cross slide 46. The bearings 44 and cross slide 46 are provided with coaxial slots 48 and 50, respectively which permit the tubing 10 to pass therethrough. Since the slot 38 on the forward face of the cutter head 28 communicates with bore 30, a continuous, centrally disposed passageway is provided in the cutter head through which the tubing 10 may pass. After the tubing passes through the cutter head 28, it is directed into a guide 52 (FIGURE 1) which constrains the tubing against lateral movement.

Milled in the tubular cross slides 46 are a pair of vertically-extending slots or keyways 54 and 56 (FIGURE 3) which receive cutting tool assemblies 58 and 60 respectively. Each cutting tool assembly comprises a main shank portion 62 which fits into one of the keyways 54 or 56, and a cutting tool proper 64 projecting outwardly from the side of the shank portion as best shown in FIGURE 2. As will hereinafter be explained, only the tool 58 is used during a cutting operation, the other tool 60 being a spare tool which may be interchanged with tool 58 when necessary. The tools 58 and 60 slide within the slot 38 on the forward face of the cutter head on bearing plates 66 and 68 which are screwed or otherwise securely fastened to the opposite edges of the slot.

Integral with one end of the cylindrical cross slide 46, as best shown in FIGURE 3, is a threaded rod 70 adapted to receive one or more annular weights 72 which are held in abutment with the cross slide 46 by a nut 74. In a similar manner, the other end of the cylindrical cross slide 46 is provided with a threaded extension 76, as best shown in FIGURE 2, which receives an annular spring-retainer 78 and a nut 80. A coil spring 82 is interposed between the spring retainer 78 and the shoulder 36, the arrangement being such that the spring will normally bias the cross slide 46 to the position shown in FIGURE 3 wherein it abuts the shoulder 34. Under these conditions (i.e., when cross slide 46 abuts shoulder 34), the shaft 16 and cutter head 28 will be stationary. When, however, the clutch-brake 22 engages with the pulley 24, the shaft 16 and cutter head 28 will rotate; and, because of the added weights 72 on the side of the cross slide 46 opposite the cutting tool 58, the unbalanced centrifugal force on the cross slide will cause it to move against the force of spring 82. This action, of course, will move the cutting tool assembly 58 radially inwardly toward the tubing 10. As rotation of the cutter head 28 continues, the cutting tool 64 on cutting tool assembly 58 will engage the tubing and begin to cut the same as in a turning operation while the guide 52 restrains the tubing against lateral movement. A timing device, not shown, incorporated with the clutch-brake 22, allows time for this cut-off; whence it disengages the clutch and engages the brake to stop the shaft 16 and cutter head 28. This, then removes the unbalanced centrifugal force on the cross slide 46 and permits the spring 82 to retract the cross slide to a position where it abuts the shoulder 34 preparatory to a succeeding cutting operation. Once an end of the tubing 10 is severed, a timing device, similar to that associated with the clutch-brake 22, engages the drive for feed rolls 12 whereby the tubing is advanced through the cutter head 22 for a predetermined distance before the next cutting operation is started.

It can thus be seen that the present invention provides a means for cutting workpieces, particularly tubular articles, wherein the cutting action is achieved by means of a tool which rotates around the workpiece to be cut and is drawn into the workpiece by centrifugal force such that a clean and unburred cut is achieved without damage to the tube ends. Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. A rotary cutter for metal workpieces and the like comprising a cutting tool rotatable in a first plane of rotation around a workpiece to be cut, said tool being movable radially inwardly or outwardly with respect to the workpiece to be cut, and a weight connected to said cutting tool and rotatable therewith and located in a second plane of rotation maintained at a fixed distance from said first plane of rotation at a position 180 degrees removed with respect to the cutting whereby centrifugal force on the weight will pull the cutting tool into engagement with the workpiece.

2. A rotary cut-off mechanism comprising: a cut-off tool rotatable in a first plane of rotation about a workpiece; means to radially shift said cut-off tool inwardly or outwardly with respect to said workpieces; a mass connected to said cut-off tool and rotatable therewith and located in a second plane of rotation maintained at a fixed distance from said first plane of rotation on the side of said workpiece remote from said cut-off tool; and biasing means acting in opposition to centrifugal force to retract said cut-off tool from said workpiece, whereby centrifugal force developed by rotation of said cut-off tool mass will radially shift said cut-off tool toward said workpiece, and said biasing means responsive to a decrease of centrifugal force will radially shift said cutting tool away from said workpiece.

3. A rotary cutter comprising a rotatable member having a bore extending therethrough with the bore intersecting the axis of rotation of the member at right angles thereto, means for positioning a workpiece to be cut in general alignment with said axis of rotation, cutting tool means slidably received within said bore and positioned on one side of said axis of rotation, and a weight connected to said cutting tool means, said weight being slidably received within the bore on the side of said axis of rotation opposite the cutting tool, whereby centrifugal force on said weight will force the cutting tool radially inwardly toward the workpiece to be cut.

4. A rotary cutter comprising a rotatable member having a bore extending therethrough with the bore intersecting the axis of rotation of the member at right angles thereto, means for positioning a workpiece to be cut in general alignment with said axis of rotation, cutting tool means slidably received within said bore and positioned on one side of said axis of rotation, resilient means biasing the cutting tool means radially outwardly from said axis of rotation, and a weight connected to said cutting tool means, said weight being slidably received within the bore on the side of said axis of rotation opposite the cutting tool means, whereby centrifugal force on said weight will move the cutting tool means radially inwardly against the force of said resilient means and into engagement with a workpiece to be cut.

5. A rotary cutter comprising a rotatable member having a first bore extending therethrough along its axis of rotation and adapted to receive a workpiece to be cut, a second bore extending through said member and intersecting the first bore at right angles to said axis of rotation, a cutting tool slidably received within the second bore, spring means biasing the cutting tool radially outwardly from said axis of rotation, and a weight connected to said cutting tool and slidably received within the second bore on the side of said axis of rotation opposite the cutting tool, whereby rotation of said member will cause the weight to be forced radially outwardly under centrifugal force while causing the cutting tool to be moved radially inwardly against the force of said spring and into engagement with a workpiece to be cut.

6. A rotary cutter comprising a rotatable member having a first bore extending therethrough along its axis of rotation and adapted to receive a workpiece to be cut, second and third communicating coaxial bores in said member with the axes of the second and third bore intersecting said axis of rotation at right angles thereto, said second bore extending from one side of the member through said axis of rotation, generally annular shoulder means interposed between the second and third bores, cutting tool means slidably disposed within said second bore, an extension on the cutting tool means projecting into said third bore, a spring device interposed between an end of the extension and said generally annular shoulder means whereby the cutting tool means will be urged toward the annnular shoulder means on one side of said axis of rotation, and a weight slidably disposed within said second bore and connected to the cutting tool means, said weight being positioned on the side of the axis of rotation opposite the cutting tool means, whereby rotation of said member will exert centrifugal force on the weight to move the cutting tool means radially inwardly into engagement with a workpiece positioned within the first bore against the force exerted by the spring device, said spring device serving to return the cutting tool means into engagement with the shoulder means in the absence of centrifugal force on the weight.

7. A rotary cutter comprising a rotatable member having a first bore extending therethrough along its axis of rotation and adapted to receive a workpiece to be cut, second and third communicating coaxial bores in said member with the axes of the second and third bores intersecting said axis of rotation at right angles thereto, said second bore extending from one side of the member through said axis of rotation, generally annular shoulder means interposed between the second and third bores, a member slidably positioned within said second bore, a slot in the slidable member adapted to permit a workpiece in the first bore to pass therethrough while permitting limited sliding movement of the slidable member in said second bore, a cutting tool carried at the end of the slidable member adjacent said annular shoulder means whereby movement of the slidable member away from the shoulder means will cause the cutting tool to engage a workpiece projecting through said slot, an extension on the slidable member projecting into said third bore, and a spring device interposed between an end of the extension and said annular shoulder means whereby the slidable member and the cutting tool carried thereby will be urged toward the annular shoulder on one side of said axis of rotation, said slideable member having unbalanced weights on opposite sides of said axis of rotation with the greater portion of the weight of the slidable member being positioned on the side of the axis of rotation opposite said cutting tool, whereby rotation of said rotatable member will exert centrifugal force on the slidable member to move the cutting tool means radially inwardly into engagement with a workpiece positioned within the first bore.

8. A rotary cutter comprising a rotatable member having a first bore extending therethrough along its axis of rotation and adapted to receive a workpiece to be cut, a second bore extending through said member and intersecting the first bore at right angles to said axis of rotation, a member slidably positioned within said second bore, a slot in the slidable member adapted to permit a workpiece in the first bore to pass therethrough while permitting limited movement of the member in said second bore, and a cutting tool carried on the slidable member at a point radially offset with respect to said axis of rotation whereby movement of the slidable member in one direction will cause the cutting tool to engage a workpiece projecting through said slot, said slidable member having unbalanced weights on opposite sides of said axis of rotation with the weight on the slidable member on the side of the axis of rotation opposite said cutting tool being greater than that on the side of the axis adjacent the cutting tool, whereby centrifugal force on the slidable member will move the cutting tool into engagement with a workpiece positioned within said first bore and projecting through said slot.

References Cited in the file of this patent

UNITED STATES PATENTS

| 2,368,846 | Klomp | Feb. 6, 1945 |

FOREIGN PATENTS

| 402,079 | Germany | Sept. 13, 1924 |